EPITAXIAL GROWTH OF BINARY SEMICONDUCTORS
Filed July 5, 1961
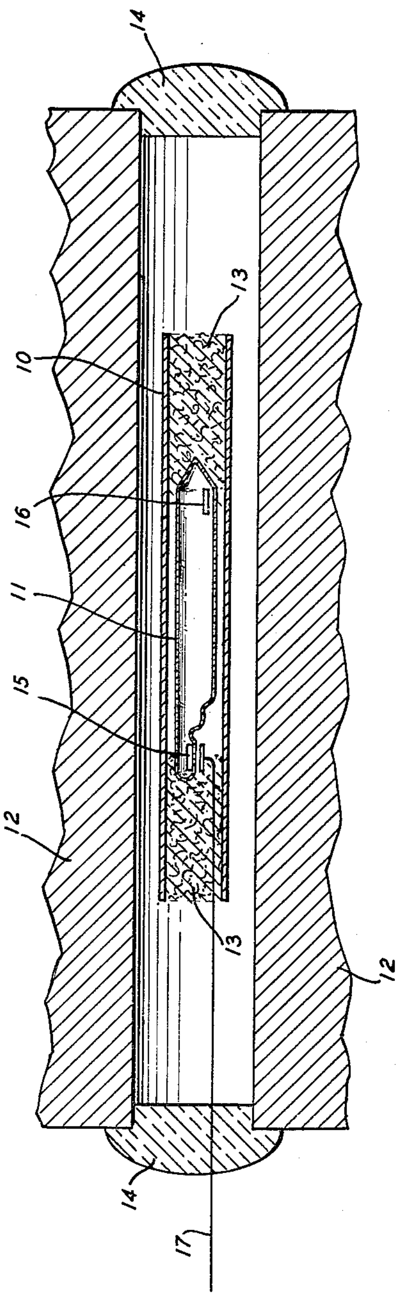
INVENTOR
R. R. MOEST
BY George S. Indig
ATTORNEY United States Patent Office 3,178,313

Patented Apr. 13, 1965

3,178,313
EPITAXIAL GROWTH OF BINARY SEMICONDUCTORS

Rupert R. Moest, Watchung, N.J., assignor to Bell Telephone Laboratories, Incorporated, New York, N.Y., a corporation of New York Filed July 5, 1961, Ser. No. 121,998
7 Claims. (Cl. 117—201)

This invention relates to a novel procedure for the growth of epitaxial films of gallium arsenide and gallium phosphide.

Epitaxial films of semiconductors on semiconducting or conducting surfaces have recently become of interest in the manufacture of various semiconductor devices, notably more efficient transistors providing higher frequency response. The uses and requirements of epitaxial films are now established in the art and various specific device applications can be found, for instance, in copending application Serial No. 35,152, filed June 10, 1960.

The growth of epitaxial films of III–V compounds has met with difficulty due in part to the problem of controlling the simultaneous reactions of two elements. Consequently, prior techniques found effective in growing epitaxial films of germanium and silicon are of little value when applied to gallium arsenide and gallium phosphide.

It has now been found that an efficient and effective growth mechanism exists within critically prescribed temperature conditions if a prescribed atmospheric composition is maintained. If the atmosphere consists essentially of a hydrogen halide gas an effective and highly controllable reaction occurs between the gas and a gallium arsenide or gallium phosphide source material, resulting in a vapor-phase species. This product is transferred by means of a thermal gradient to the semiconductor substrate where the epitaxial growth occurs. The growth is extremely controllable both as to resistivity and thickness and exhibits a high degree of crystal uniformity and perfection.

The following description and specific embodiments are in part described with reference to the drawing in which:

The figure is a diagrammatic representation of an apparatus suitable for the practice of the invention.

The figure shows an exemplary apparatus for growing epitaxial gallium arsenide or gallium phosphide films by the novel procedure of this invention. In the figure a Kovar sleeve 10 containing the reaction chamber 11 is shown disposed in furnace 12. The reaction chamber is a quartz ampoule maintained in place by quartz wool packing 13. The Kovar sleeve in addition to providing a support also assures a uniform temperature distribution in the quartz ampoule 11. Asbestos plugs 14 are used to seal the quartz ampoule in the furnace. Within the quartz ampoule are disposed the semiconductor substrate 15 and the gallium arsenide or gallium phosphide source 16. Immediately adjacent the substrate 15 at the exterior of the quartz ampoule is a heat sink 17, in this instance a silver wire, which, by conduction, maintains the substrate at a lower temperature than the surrounding system. The silver wire has a globule 3 mm. x 3 mm. at the extremity adjacent the source so as to provide a greater heat capacity at that point. The other extremity of the wire, external of the furnace, may be immersed in a cold bath (e.g., Dry Ice) to provide an effective rate of heat transfer. The temperatures of various points in the system may be observed by conventional means (not shown) such as optical pyrometers or thermocouples. The physical form of the reaction chamber is not critical. Specifications found adequate are: overall length 5–7 cm., volume 4–6 cc., outside diameter 12 mm., inside diameter 9 mm. An appropriate spacing between the source and the substrate wafer is 4–6 cm.

The transfer mechanism is controlled within critically prescribed temperatures. For gallium arsenide the source temperature is maintained in the range 550° C.–1200° C. and preferably within the range 600° C.–750° C. The corresponding semiconductor substrate is maintained at 500° C.–1150° C. and preferably 550° C.–700° C. In selecting temperatures within these ranges it is essential that a temperature gradient be maintained between the source and substrate. This gradient must be at least 10° to provide a reasonable growth rate. Gradients in excess of 100° C. should be avoided as the control over the growth and the crystal perfection are detrimentally affected. A preferred range for the temperature gradient is 20° C.–50° C. For gallium phosphide the appropriate source temperature is in the range 750° C.–1200° C., with 800° C. to 950° C. representing a preferred operating range. The substrate should be maintained within the range 650° C.–1100° C. and preferably 700° C.–850° C. The required temperature gradient for gallium phosphide is somewhat higher than that for gallium arsenide due in part to the lower vapor pressure of its vapor reaction products at the operating temperatures. Gradients in the range of 80° C.–120° C. provide the most desirable results.

The process of this invention is adapted to the growth of epitaxial films of either conductivity type and of any ordinary resistivity value. Epitaxial films within the context of this specification are those which exhibit the same crystal structure and orientation of the substrate and are matched at the interface. Such films are generally 1–30 microns in thickness.

The following specific embodiments are given as exemplary of the process of this invention.

*Example I*

In this example an epitaxial film of GaAs was grown on a GaAs substrate, using the procedure previously outlined with the following specific operating conditions:

Substrate: GaAs; conductivity type: n; Sn-doped; (111) oriented.
Source: GaAs; conductivity type: n; S-doped.
Size of substrate: 32 mm.$^2$ x 8 mils.
Atmosphere: HCl at 240 mm. Hg initial pressure.
Time of run: 10 min.
Temperature of substrate: 638° C.
Temperature of source: 700° C.
Temperature gradient between source and substrate: 62° C.
Film thickness on exposed surface of substrate: 4 microns.
Film conductivity: n-type.

*Example II*

In this example a GaAs film was grown on a Ge substrate according to the following detailed specifications:

Substrate: Ge; conductivity type: p; (111) oriented.
Source: GaAs; conductivity type: n; polycrystalline.
Size of substrate: 32 mm.$^2$ x 8 mils.
Atmosphere: HCl at 240 mm. Hg initial pressure.
Temperature of substrate: 655° C.
Temperature of source: 695° C.
Temperature gradient between source and substrate: 40° C.
Film thickness on exposed surface of substrate: 15 microns.
Film conductivity: n-type.

*Example III*

This example gives conditions for the growth of GaAs films on GaP substrates.

Substrate: GaP; conductivity type: n; orientation: (111).
Source: GaAs; conductivity type: p.
Size of substrate: 40 mm.$^2$ x 9 mils.
Atmosphere: HCl at 240 mm. Hg initial pressure.
Temperature of substrate: 650° C.
Temperoture of source: 700° C.
Temperature gradient between substrate and source: 50° C.
Time of run: 30 minutes.
Film thickness: 5.1 microns.
Film conductivity: p-type.

*Example IV*

This example illustrates the adaptation of the procedure of this invention to the growth of GaP films on semiconductor substrates. In this embodiment a GaP film was grown on a GaAs substrate according to the following specifications:

Substrate: GaAs; conductivity type: p; Zn-doped; (111) oriented.
Source: GaP; conductivity type: n; S-doped; polycrystalline.
Size of substrate: 40 mm.$^2$ x 9 mils.
Atmosphere: HCl at 240 mm. Hg initial pressure.
Time of run: 10 min.
Temperature of substrate: 760° C.
Temperature of source: 880° C.
Temperature gradient between source and substrate: 120° C.
Film thickness: 23.7$\mu$.
Film conductivity: n-type.

A variety of operating conditions have been used in the growth of epitaxial gallium arsenide and gallium phosphide. For example substrate orientations including (100) and (110) have proven satisfactory as have a wide range of operating pressures and resistivities.

Various other extensions and modifications of this process will become apparent to those skilled in the art. All such deviations and variations which basically rely on the concepts through which this invention has advanced the art are properly considered within the scope of this invention.

What is claimed is:

1. A process for growing an epitaxial semiconductor film selected from the group consisting of gallium arsenide and gallium phosphide on a semiconductor substrate which comprises heating a source consisting essentially of the semiconductor desired in the film in an atmosphere consisting essentially of HCl, and vapor depositing said film material on the surface of said substrate by maintaining a thermal gradient between said substrate and said source.

2. The process of claim 1 wherein the substrate is a material selected from the group consisting of gallium arsenide, gallium phosphide and germanium.

3. A process for growing an epitaxial gallium arsenide film on a semiconductor substrate which comprises maintaining a gallium arsenide source material and said substrate at temperatures of 550° C.–1200° C. and 500° C.–1150° C. respectively, in an atmosphere consisting essentially of HCl and maintaining a thermal gradient of 10–100° C. between said source and said substrate for a period sufficient to produce an epitaxial gallium arsenide film on said substrate.

4. The process of claim 3 wherein the temperature of the source and substrate are 600° C.–750° C. and 550° C.–700° C., respectively.

5. The process of claim 3 wherein the thermal gradient is 20–50° C.

6. A process for growing an epitaxial gallium phosphide film on a semiconductor substrate which comprises maintaining a gallium phosphide source material and said substrate at temperatures of 750° C.–1200° C. and 650° C.–1100° C. respectively in an atmosphere consisting essentially of HCl and maintaining a thermal gradient of 80–120° C. for a period sufficient to produce an epitaxial gallium phosphide film on said substrate.

7. The process of claim 6 wherein the temperature of the source and substrate are 800° C.–950° C. and 700° C.–850° C., respectively.

References Cited by the Examiner

UNITED STATES PATENTS 2,692,839 10/54 Christensen et al. ------ 117—106

OTHER REFERENCES

Chemistry and Engineering News, April 18, 1960, page 72 relied on.

IBM Technical Disclosure Bulletin, vol. 4, No. 7, December 1961, page 62 relied on.

RICHARD D. NEVIUS, *Primary Examiner.*